Oct. 22, 1940.  O. KNOERZER  2,218,756
IRRIGATING PIPE CONNECTOR
Filed July 13, 1938
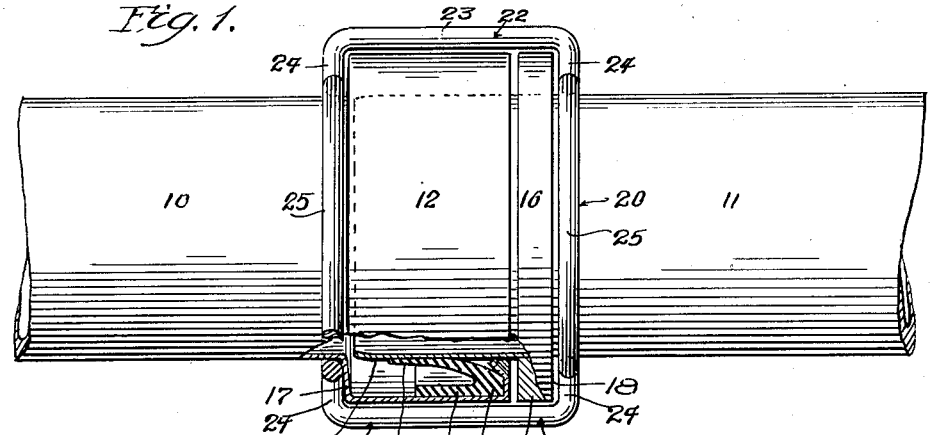
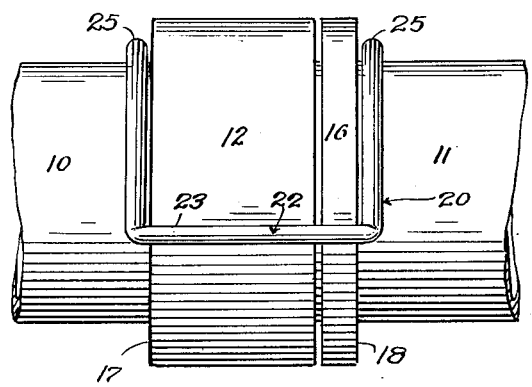
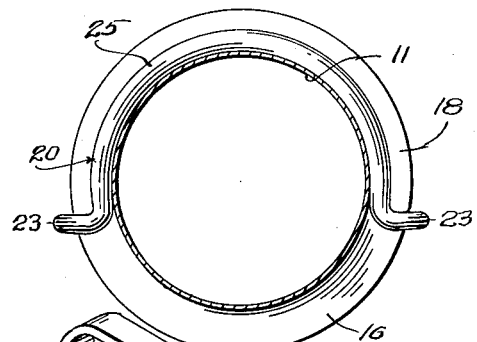
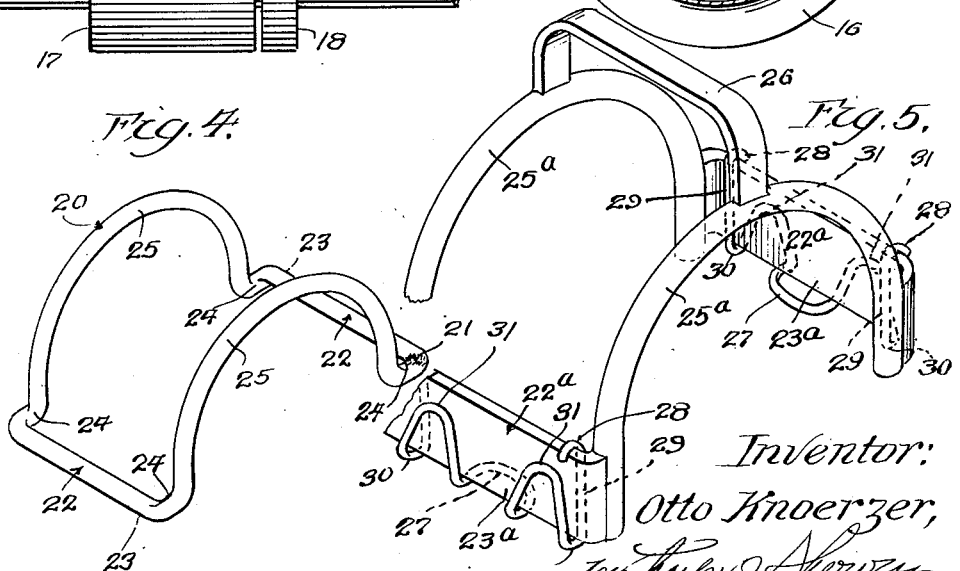
Inventor:
Otto Knoerzer,
his Atty.

Patented Oct. 22, 1940

2,218,756

UNITED STATES PATENT OFFICE 2,218,756

IRRIGATING PIPE CONNECTOR

Otto Knoerzer, Hammond, Ind., assignor to Champion Corporation, Hammond, Ind., a corporation of Indiana Application July 13, 1938, Serial No. 218,993

9 Claims. (Cl. 285—129)

This invention relates to irrigating pipe connectors and its principal object is to provide a connection between irrigating pipe sections which may be readily applied thereto and removed therefrom and which effectively holds the pipe sections from being accidentally disconnected.

Irrigating pipes now in use employ gasket protected slip joints between their ends which are leakproof despite the fact that water under very high pressure is forced through the pipes. One difficulty heretofore encountered is that of preventing separation between the pipe sections at the joints due to the pressure and also because the pipe sections are not always aligned.
In accordance with the present invention, annular shoulders are provided on the pipes at the joints, and the connector is provided with yokes having shoulders which coact with the shoulders on the pipe sections to prevent the pipes from being pulled apart at the joints.

With these and other objects in view, this invention consists in the several novel features hereinafter fully set forth and more particularly pointed out in the appended claims.

The invention is clearly illustrated in the drawing accompanying this specification in which:

Fig. 1 is a plan of fragments of two joined irrigating pipe sections partly broken out with one of the connectors embodying the present invention applied thereto.

Fig. 2 is a side elevation of the part seen in Fig. 1.

Fig. 3 is an end elevation thereof.

Fig. 4 is a perspective view of the connector removed from the pipe sections.

Fig. 5 is a perspective view of a connector partly broken away and illustrating a slightly modified form of the invention.

Referring to said drawing, the reference characters 10, 11 designate fragments of two sections of an irrigating pipe composed of light gauge sheet metal. The pipe sections are joined together as will be hereinafter explained to provide long lines of irrigating pipe connected at one end to a pump which draws water from an adjacent lake, river or other source, and pumps it through the irrigating pipe. At places along the line of the pipe, outlets are provided for discharging the water on the field and sometimes branches are provided from the main line with suitable discharge outlets. Great pressure is set up in the irrigating pipe by the pump and much difficulty has been encountered in maintaining the joints between the pipes due to said pressure and other causes.

A simple form of leakproof joint comprises a bell or enlarged head 12 on one end of each pipe section, into which the other plain end of a pipe section is inserted. Within the bell is a gasket 13 which makes a tight joint between the internal face of the bell and the external face of the end of the inserted pipe section, and as a preference, the gasket is composed of rubber or other pliable composition and is formed with two annular lips 14, 15, that bear against the bell and inserted pipe end. A more complete description of the joint illustrated will be found in Patent No. 2,066,008 dated December 29, 1936, for improvements in Irrigating pipes, invented by me.

On the end of each pipe section, opposite the one containing the bell, is welded or otherwise rigidly secured a ring or other annular member 16 which is spaced sufficiently away from the extreme end of the pipe section to permit the end to be inserted into the bell with the gasket surrounding the inserted pipe end. The end face 17 of the bell and the end face 18 of the ring form two annular shoulders which are used in connecting the two pipe sections together.

Referring now to Fig. 4, the connector 20 will be seen to comprise a single length of wire or rod bent up, as shown with the two ends welded or otherwise rigidly secured together, as at 21, to form an endless solid unit. The unit comprises two yokes 22, each having a straight member 23 bent laterally at its ends towards the middle of the connector to provide shoulders 24. The yokes are arranged to extend parallel with the length of the pipe sections with the parallel members 23 extending along the faces of the bell and ring slightly beyond the center of the pipe, and the shoulders 24 arranged to engage the opposite side faces 17, 18 of the bell and ring respectively, and prevent accidental separation between the two pipe sections. From the ends of the shoulders 24 of the yokes extend parallel curved bails 25 of slightly greater extent than a semi-circle which connect the two yokes and are arranged to extend over the two adjacent pipe sections in close proximity to the side faces 17, 18 of the bell and ring respectively. Some slight play is provided between the adjacent side faces of the bell and ring and the bails, which, however, is limited by the yokes 22 of the connector.

When two pipe sections have been joined together, as is shown in Fig. 1, the connector 20 is slipped over the two sections with the bails 25 disposed close to the side faces 17, 18 of the bell and ring and the shoulders 24 of the yokes 22 in position to engage with the end faces 17, 18 of the bell and ring respectively. The bails clasp the pipe sections and prevent accidental removal of the connector therefrom.

It will be observed that if an effort is made to pull the two pipe sections apart, the shoulders of the two yokes engage the opposite end faces of the bell and ring respectively, making it practically impossible to force the pipe sections apart. When the two pipe sections are out of alignment, the connector should be placed thereon so that the pull of the pipes upon the connector will be directly upon the two yokes thereof. This may be done by turning the connector around upon the two pipe sections until the proper place is reached. In Figs. 1 and 2 it will be observed that the connector has been located so that the yokes lie in a horizontal plane with their shoulders in position to engage the bell at two places, and the ring at two places. With the connector in the position shown, if it is required that the pipe 11 in Fig. 2 lie in an inclined position, two shoulders of the yokes will engage the ring 16 at two opposite points. If the pipe 11 in Fig. 1 is required to extend at a slight angle with respect to the pipe 10, with the connector in the position shown, only one shoulder of one yoke will engage the ring 16. Therefore, in placing the connector upon two angularly disposed pipes, it is important that the connector be placed so that two points of contact are had between the two yokes and the ring, and two points of contact are had between the yokes and the bell.

In the modified form of connector shown in Fig. 5, which is intended for irrigating pipes of larger diameter than that seen in Fig. 1, two lengths of rod are bent into semi-circular form of approximately the same internal diameter as the external diameter of the pipe sections to provide the bails 25ª. The extremities of the bails are straight and parallel and terminate slightly beyond the center of the pipe, and connecting the straight end portions of one bail with those of the other are two flat bars 23ª which have offset ends that are welded or otherwise secured to the straight end portions of the bails, and, together with said straight portions, provide yokes 22ª that are arranged to engage the opposite sides of the bell and ring of two joined pipe sections. To facilitate handling the connector illustrated in Fig. 5, a handle 26 is welded or otherwise secured to the two bails. This form of the connector is used in the same manner as that illustrated in Figs. 1 to 4 inclusive.

With this form of the invention it is desirable to provide resilient means as a spring for clasping the connector on the pipe sections to guard against accidental detachment or displacement. The means shown comprises a length of bent up wire fastened to a bar 23ª and formed with a bowed part 27 which projects inwardly from the lower edge of the bar far enough to press against the bell or enlarged head 12 of one pipe section below or beyond its diameter, thereby cooperating with the bails 25ª to clasp the pipe sections between them.

As shown the length of wire is bent at its ends to form hooks 28 that hook over the upper edge of the bar. From the hooks the end portions of the wire extend parallel with each other along the inner side of the bar as at 29 to the lower edge thereof where the wire is bent up around the lower edge as at 30, and then bent into two U shaped parts 31 which extend along the outer side of the bar. The adjacent ends of the U bends 31 are bent under the lower edge of the bar and join the bowed part 27. The straight parts 29 with the bends on their ends serve to fasten the spring on the bar and the U bends 31 enable the bowed part 27 to yield when the connector is being applied to a joint between two pipe sections and when being detached therefrom. A spring may be attached to one or both bars as is desired, and a more effective clasping action is obtained when they are applied to both bars as shown.

In both forms of the invention the two yokes engage with the bell and ring at two places on opposite sides of the pipe, so that the pull of the one pipe section away from the other is resisted by the two yokes, one on one side of the pipe and one on the other side thereof. When the two pipe sections are in alignment it makes no difference in whatever position the connector is placed upon the joint to obtain this result, but when the two sections are misaligned then the connector should be so placed on the joint that the two yokes extend along the sides of the pipe which present the angle between them. For example, if the pipe section 11 in Fig. 2 is inclined downwards slightly with the connector applied as shown, the two shoulders 24 of the two yokes 22 engage the end faces 17, 18 of the bell and ring on opposite sides of the pipe and positively prevent the two pipe sections from being pulled apart.

I claim as new and desire to secure by Letters Patent:

1. An irrigating pipe connector comprising a pair of oppositely disposed yokes having shoulders at their ends arranged to engage against the sides of annular shoulders on two joined pipe sections at opposite sides thereof, there being a pair of bails connecting corresponding ends of one yoke with those of the other and extending around the pipe sections, and spring means attached to the yokes below the center of the bails, and having parts extending inwardly from said yokes arranged to secure the connector upon the pipes.

2. A pipe connector for connecting together two joined irrigating pipe sections which are adjustable angularly and lengthwise of each other, comprising a pair of oppositely disposed yokes having parallel straight members arranged to extend parallel with the length of the pipe sections and in close proximity to adjacent annular shoulders thereon, said straight members having shoulders at their ends arranged to engage against the sides of said annular shoulders on the two joined pipe sections at opposite sides thereof to limit the relative movement of the two sections, and there being a pair of arcuate pipe-clasping bails of greater extent than a semi-circle connecting corresponding ends of one yoke with those of the other and extending around the pipe sections to places beyond a plane passing through the axis of the pipe.

3. A pipe connector for connecting together two joined adjustably connected irrigating pipe sections, one having a bell into which the other section is telescoped and the other having a ring thereon adjacent the bell, said connector comprising a pair of oppositely disposed yokes, having parallel straight members arranged to extend parallel with the pipe sections and in close proximity to the bell and ring and having shoulders at their ends arranged to engage the sides of the bell and ring to limit movement of one section relative to the other, and there being arcuate pipe-clasping bails of greater extent than a semi-circle connecting corresponding shoulders of the yokes at places located beyond a plane passing through the axis of the pipe, the yokes and bails being composed of a single length of wire or rod with its ends welded together.

4. A pipe connector for connecting together two joined irrigating pipe sections each adjustable angularly and lengthwise with respect to the other and one having a bell into which the end of the other section is telescoped, and said other section having a ring thereon adjacent the bell, said connector comprising a pair of oppositely disposed yokes having parallel straight members arranged to extend parallel with the length of the pipe sections, and in close proximity to the sides of the bell and ring and having shoulders at their ends arranged, to engage against the opposite sides of the bell and a ring to limit the angular and lengthwise adjustment of the sections, there being arcuate bails of greater extent than a semi-circle connecting corresponding shoulders of the yokes and arranged to extend around the pipe sections, and there being a handle connected to and forming a brace between the two bails.

5. In combination with two angularly and longitudinally adjustable irrigating pipe sections, one having a bell on one end adapted to receive an end of the other pipe section and said other pipe section having a ring fixed thereon, and there being a gasket in said bell contacting with the bell and the inserted pipe section, a removable and replaceable connector separate from the pipe sections and formed with a pair of oppositely disposed yokes having parallel straight members arranged to extend parallel with the pipe sections and in close proximity to the bell and ring, said straight members having shoulders arranged to engage the opposite sides of the bell and ring to limit the angular and lengthwise adjustment of the two pipe sections, and a pair of arcuate pipe-clasping bails of greater extent than a semi-circle connecting corresponding ends of the yokes, said connector being shiftable around the sides of the pipe sections.

6. In combination with two angularly and lengthwise adjustable irrigating pipe sections, one having a bell on one end adapted to receive an end of the other pipe section and said other pipe section having a ring fixed thereon and there being a gasket in said bell contacting with the bell and the inserted pipe section, a removable and replaceable connector separate from the pipe sections and formed with a pair of oppositely disposed yokes having parallel straight members arranged to extend parallel with the pipe sections and in close proximity to the bell and ring, said straight members having shoulders arranged to engage the opposite sides of the bell and ring to limit the angular and lengthwise adjustment of the two sections, a pair of arcuate pipe-clasping bails each of greater extent than a semi-circle connecting corresponding ends of the yokes, and a handle connecting the two bails and forming a brace therebetween, said connector being shiftable around the sides of the pipe sections.

7. An irrigating pipe connector comprising a pair of bails arranged to partly surround two joined pipe sections, parallel straight bars connecting the ends of one bail with those of the other bail, and resilient means fastened to one bar and having a part projecting inwardly toward the pipe below the center thereof, and adapted to prevent accidental removal of the connector from the pipe sections.

8. An irrigating pipe connector comprising a pair of bails arranged to partly surround two joined pipe sections, parallel straight bars connecting the ends of one bail with those of the other bail and spring means attached to each bar and each having a part projecting inwardly toward the pipe below the center thereof and arranged to prevent accidental disconnection between the connector and pipe sections.

9. A pipe connector for connecting together two joined irrigating pipe sections which are adjustable angularly and lengthwise of each other, one of which has a bell thereon and the other a ring thereon, said connector comprising a pair of oppositely disposed yokes having parallel straight members arranged to extend parallel with the length of the pipe sections and having shoulders at their ends arranged to engage against the sides of the bell and ring of the two joined pipe sections, at opposite sides thereof to limit the movement of the sections relative to each other, and there being a pair of arcuate pipe clasping bails connecting corresponding ends of one yoke with those of the other, and extending around the pipe sections, said connector being shiftable around the pipe sections whereby to bring the shoulders of the two yokes into engagement with the bell and ring at two opposite places thereon in any angular position of the two pipes.

OTTO KNOERZER.